Patented Jan. 12, 1932

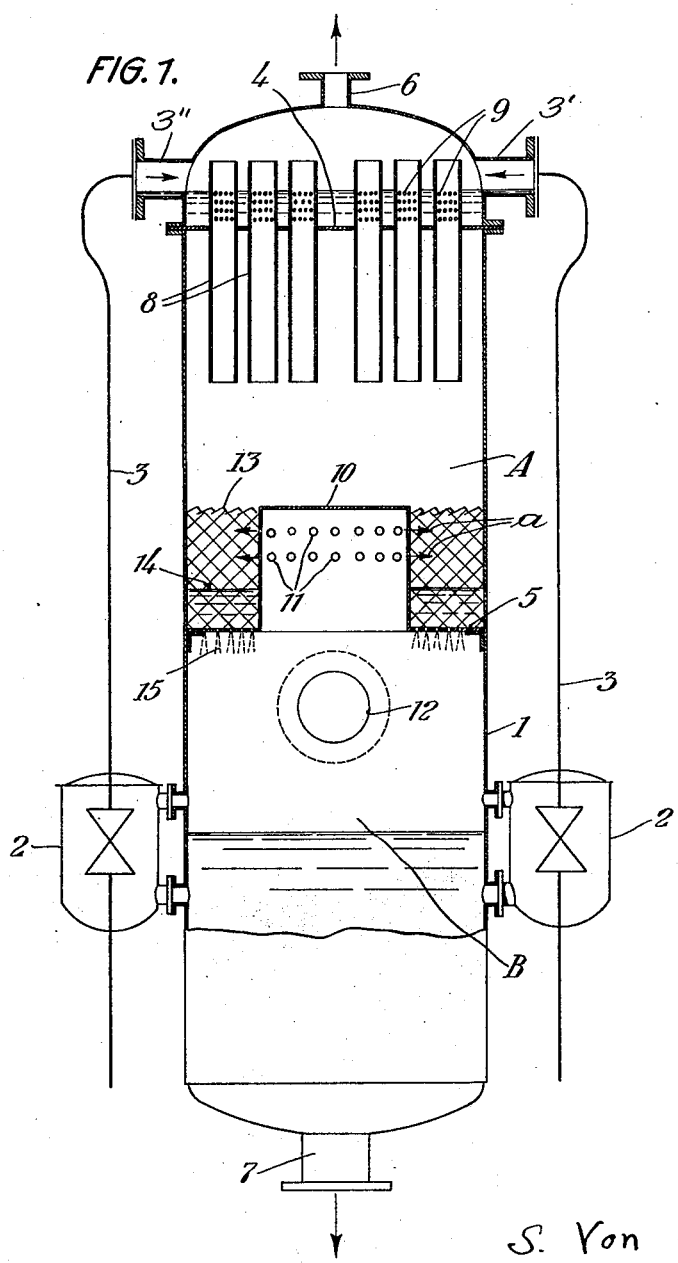

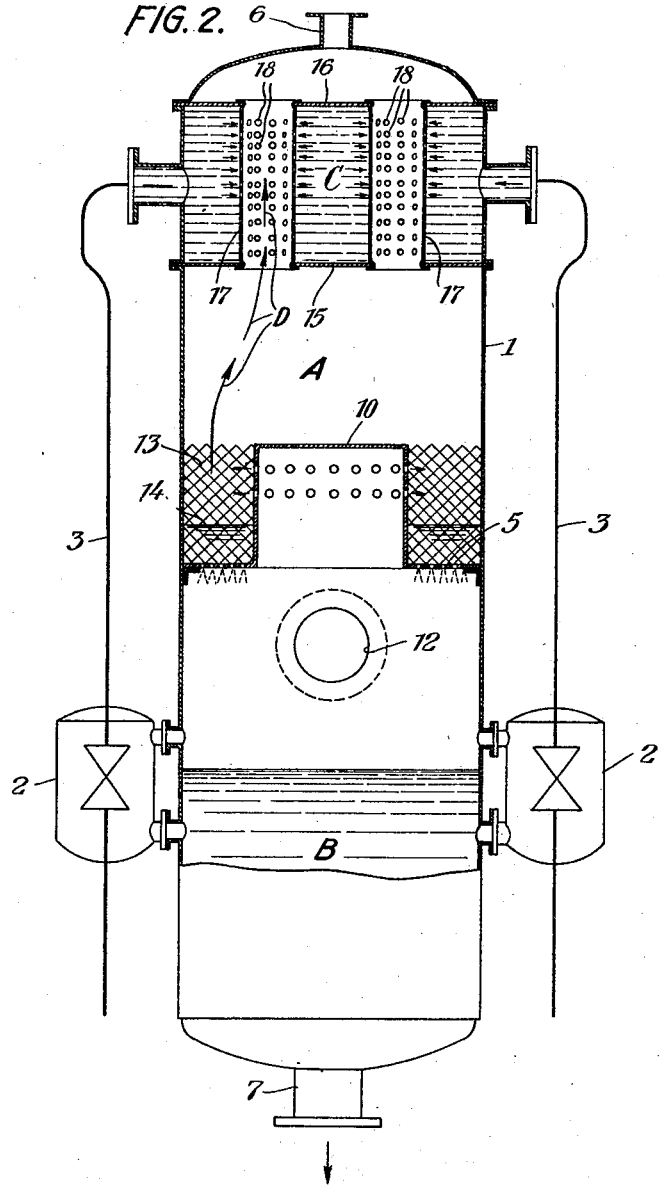

1,841,200

UNITED STATES PATENT OFFICE

SERGIUS VON LE JUGE, OF BREMEN, GERMANY

PREHEATER FOR BOILER FEED WATER

Application filed November 12, 1930, Serial No. 495,270, and in Germany August 16, 1929.

Preheaters for boiler feed water are known in which the feed water is mixed with the heating steam and in such a preheater distributing floor tubes or similar trickle devices of relatively small diameter are provided, in which the water to be heated is led in above the distributing floor and is subjected, while trickling through the tubes, to the action of the rising heating steam as it passes through the tubes. In such devices an independent vapour cooler is disposed on the preheater, by which some of the heat drop of the escaping vapours is to be further utilized and transmitted to the water which is to be preheated.

Such an additional cooler is inconvenient and expensive in construction, has considerable weight and even when it is of low structure it increases the total height of the preheater and consequently its weight. Moreover, the great number of tubes or trickling devices disposed in the distributing floor also represent a considerable weight. Now in means for driving ships the possibility of saving weight while retaining the same power is of the greatest importance. A saving in weight in addition to other advantages is obtained according to the present invention by employing, instead of a number of preheater tubes of small section as trickling devices, tubes of comparatively large section, and providing that these, owing to their peculiar construction, simultaneously function as a cooler, so that a separate cooler need not be used. In addition the water distribution in the preheater is considerably more independent of the rocking of the ship and the preheating of the water in the heating tubes is made more intensive.

Furthermore, according to the present invention the hot steam is not admitted free into the preheater space, but enters this space through a dividing floor or a steam dome rising above the dividing floor, with or without a layer of filling bodies distributing around the steam dome.

In the accompanying drawings a constructional example of the invention is shown.

Fig. 1 being a longitudinal section partly in elevation of a preheater and

Fig. 2 a similar longitudinal section and elevation through another constructional form of the preheater.

In the drawings 1 is the body of the preheater, 2 are two float valves in water supply pipes 3, which are connected to spigots 3', in the upper part of the preheater body, 4 is a distributing floor, 5 a floor which divides the preheater space from the water space below it, 6 is a spigot through which the driven off gases are drawn by suction, 7 is a spigot which connects to the boiler supply pump, or possibly to a further collecting receptacle.

According to the present invention the trickle bodies consist of a comparatively small number of tubes 8 of large diameter which above the distributing floor 4 have a number of small openings 9 which admit the water standing above the distributing floor in the form of a spray into the stream of steam passing through the tube. In this manner this part of the preheater simultaneously functions as a cooler.

According to the invention, moreover, above the floor 5 which divides the steam space A from the water space B is a steam dome 10 with a number of openings 11 in its sides. This steam dome allows the steam which enters the preheater at 12 to escape sideways in the direction of the arrows a. Preferably in the space between the side walls of the steam dome 10 and the wall of the preheater body 1 are arranged packings such as Raschig rings, as indicated at 13. 14 indicates the water level above the floor 5. In the latter are provided a large number of openings through which the water can flow downwards in finely divided streams as indicated at 15.

By this arrangement feed water which has already been brought to boiling temperature in the preheater tubes, on flowing through the annular space between the steam dome and the side of the preheater body, is finely divided and so has the opportunity of coming intensively into contact with the hot steam passing out through the openings 11 and thus the last remaining traces of air are driven off.

By the arrangement of the steam dome above the dividing floor 5 a separate float device above this floor is rendered unnecessary, the operation of such a device being not always reliable in operation when the ship is rocking.

In the constructional form shown in Fig. 2 the same parts bear the same references as in Fig. 1. In this constructional form the distributing floor of the preheating device is a double floor, consisting of the two plates 15 and 16 and the trickling devices for instance in the form of tubes 17 extend from the plate 15 almost to the other plate 16. These trickling devices may, as in the example shown, be rolled into the two plates 15 and 16 or may be inserted loosely between the two plates, being held in position by suitable securing means. In this way a further closed space C is formed in the preheating device which enables the liquid flowing in through the pipes 3 to be led in under pressure so that the liquid enters in definite jets through the openings 18 of the trickling devices and acts in a particularly intensive manner on the stream of vapour flowing through the trickling devices (see arrow D). In this connection it is also to be noted that the inlet pipes 3″ communicate with the body between the plates 15 and 16.

What I claim is:

1. A preheater for boiler feed water device, more particularly suitable for marine purposes, comprising a container, a distributing floor in the said container, tubular trickling devices of relatively large cross-sectional area in the distributing floor, a plurality of small openings in the said trickling devices, inlet spigots for the water to be preheated, disposed above the distributing floor, a second floor disposed below the distributing floor for holding back a certain quantity of water, outlet openings in the said second floor, and an inlet opening for heating steam disposed below the said second floor.

2. A preheater for boiler feed water device, more particularly suitable for marine purposes, comprising a container, a distributing floor in the same container, tubular trickling devices of relatively large cross-sectional area in the distributing floor, a plurality of small openings in the said trickling devices, inlet spigots for the water to be preheated, disposed above the distributing floor, a second floor disposed below the distributing floor for holding back a certain quantity of water, outlet openings in the said second floor, a steam dome rising over the said second floor, steam outlet openings in the said dome, additional trickling devices above the said second floor, and an inlet opening for heating steam disposed below the said second floor, as and for the purpose set forth.

3. A preheater for boiler feed water device, more particularly suitable for marine purposes, comprising a container, two distributing floors in the said container, tubular trickling devices disposed between the said two distributing floors, a plurality of small openings in the said trickling devices, inlet spigots for the water to be preheated, disposed between the two distributing floors, a second floor disposed below the distributing floors for holding back a certain quantity of water, outlet openings in the said second floor, and an inlet opening for heating steam disposed below the said second floor, as and for the purpose set forth.

4. A preheater for boiler feed water device, more particularly suitable for marine purposes, comprising a container, two distributing floors in the said container, tubular trickling devices disposed between the said two distributing floors, a plurality of small openings in the said trickling devices, inlet spigots for the water to be preheated, disposed between the two distributing floors, a second floor disposed below the distributing floor for holding back a certain quantity of water, outlet openings in the said second floor, a steam dome rising over the said second floor, steam outlet openings in the said dome, additional trickling devices above the said second floor, and an inlet opening for heating steam disposed below the said second floor, as and for the purpose set forth.

In testimony whereof I have signed my name to this specification.

SERGIUS VON LE JUGE.